United States Patent
Yue

(10) Patent No.: US 10,281,654 B2
(45) Date of Patent: May 7, 2019

(54) METHOD AND APPARATUS FOR PROVIDING MULTIPORT FREE-SPACE WAVELENGTH-DIVISION MULTIPLEXING (WDM) DEVICE USING A RELAY LENS

(71) Applicant: OPTIWORKS, INC., Fremont, CA (US)

(72) Inventor: Xuefeng Yue, San Jose, CA (US)

(73) Assignee: OW Holding Inc., Grand Cayman (KY)

(*) Notice: Subject to any disclaimer, the term of this patent is extended or adjusted under 35 U.S.C. 154(b) by 0 days.

(21) Appl. No.: 15/488,391

(22) Filed: Apr. 14, 2017

(65) Prior Publication Data

US 2017/0285269 A1   Oct. 5, 2017

Related U.S. Application Data

(63) Continuation-in-part of application No. 14/852,543, filed on Sep. 12, 2015, now abandoned, which is a
(Continued)

(51) Int. Cl.
*G02B 6/32* (2006.01)
*G02B 13/00* (2006.01)
(Continued)

(52) U.S. Cl.
CPC ....... *G02B 6/2938* (2013.01); *G02B 6/29365* (2013.01); *G02B 6/29367* (2013.01);
(Continued)

(58) Field of Classification Search
None
See application file for complete search history.

(56) References Cited

U.S. PATENT DOCUMENTS 4,715,699 A * 12/1987 Morimoto .......... G06K 15/1228
  359/206.1
5,274,385 A * 12/1993 Riza .................... H01Q 3/2676
  250/227.12

(Continued)

*Primary Examiner* — Darren E Wolf
(74) *Attorney, Agent, or Firm* — Intellectual Property Law Group LLP

(57) ABSTRACT

Method and multiport free-space wavelength division multiplexing ("WDM") device capable of handling multiple optical signals carried in multiple wavelengths ("$\lambda_n$") using a relay lens are disclosed. The WDM device includes an optical filter, collimator, optical relay, and a relay optical filter. The optical filter is able to receive an optical beam containing multiple $\lambda_n$ and subsequently extract a first wavelength ("$\lambda_1$") from $\lambda_n$. A second optical beam is formed by the remaining of $\lambda_n$. The collimator, in one example, receives $\lambda_1$ from the optical filter. Upon receiving the second optical beam, the optical relay collimates the second optical beam with minimal loss due to light divergence. The relay optical filter, in one aspect, is configured to receive the collimated second optical beam and redirects the collimated second optical beam to a predefined intended orientation.

30 Claims, 9 Drawing Sheets

Related U.S. Application Data continuation-in-part of application No. 14/852,540, filed on Sep. 12, 2015, now abandoned, which is a continuation-in-part of application No. 14/852,542, filed on Sep. 12, 2015, now abandoned.

(51) Int. Cl.

| | | |
|---|---|---|
| *G02B 6/293* | (2006.01) | |
| *H04B 10/40* | (2013.01) | |
| *H04B 10/50* | (2013.01) | |
| *H04B 10/60* | (2013.01) | |
| *H04J 14/02* | (2006.01) | |

(52) U.S. Cl.
CPC ........... *G02B 6/32* (2013.01); *G02B 13/0095* (2013.01); *H04J 14/02* (2013.01); *H04J 14/0256* (2013.01); *G02B 6/327* (2013.01); *H04B 10/40* (2013.01); *H04B 10/50* (2013.01); *H04B 10/60* (2013.01)

(56) References Cited

U.S. PATENT DOCUMENTS

| | | | |
|---|---|---|---|
| 8,351,791 B1 * | 1/2013 | Wang | H04J 14/02 398/85 |
| 8,488,244 B1 * | 7/2013 | Li | G02B 27/1006 359/618 |
| 2002/0181046 A1 * | 12/2002 | Jeong | G02B 6/29362 398/79 |
| 2005/0024702 A1 * | 2/2005 | Takeuchi | G02B 26/123 359/207.3 |
| 2009/0040615 A1 * | 2/2009 | Koeppen | G02B 5/1866 359/566 |
| 2010/0329678 A1 * | 12/2010 | Wang | G02B 6/29367 398/79 |
| 2017/0082491 A1 * | 3/2017 | Stephen | G01J 3/45 |

\* cited by examiner

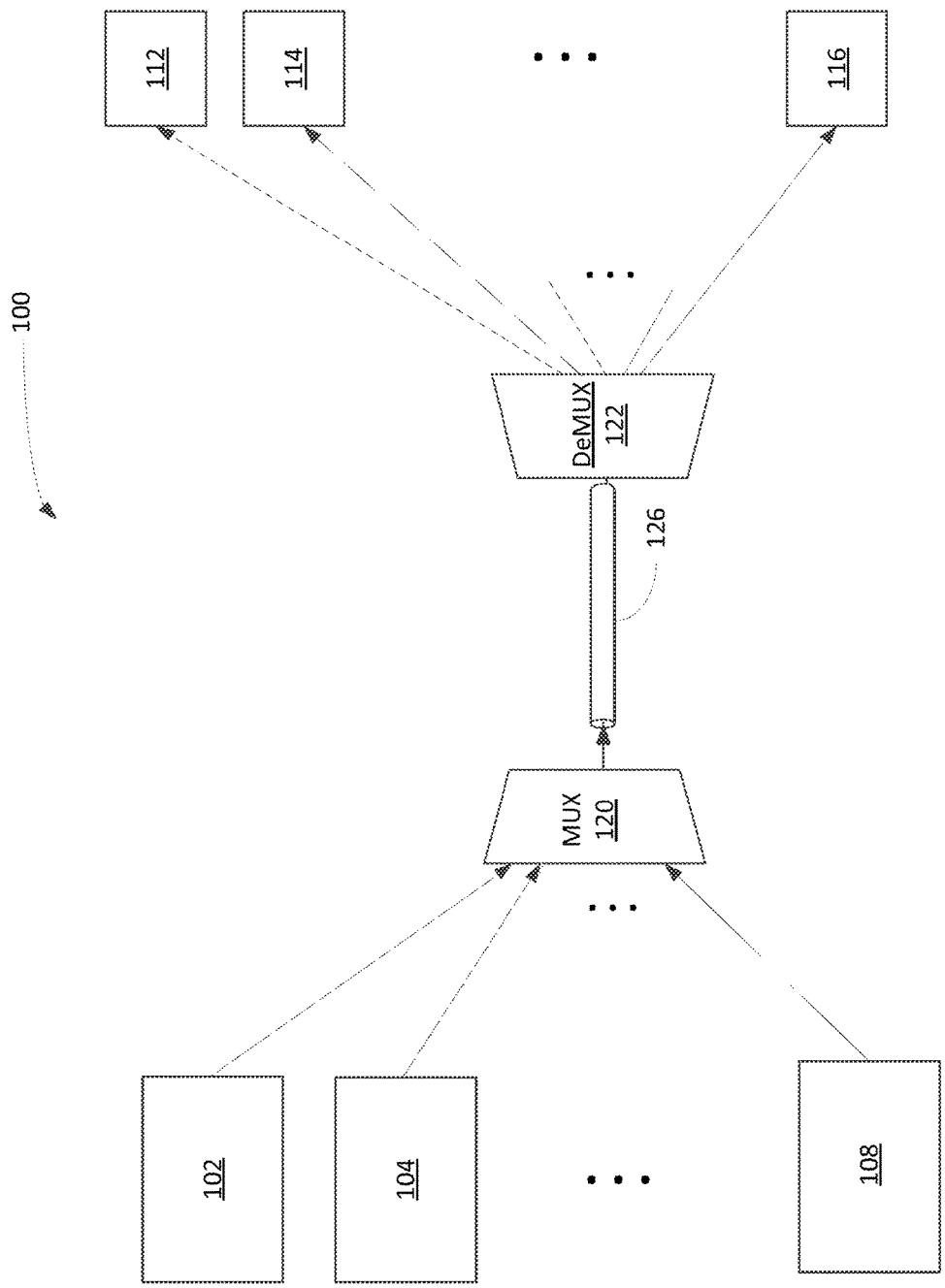

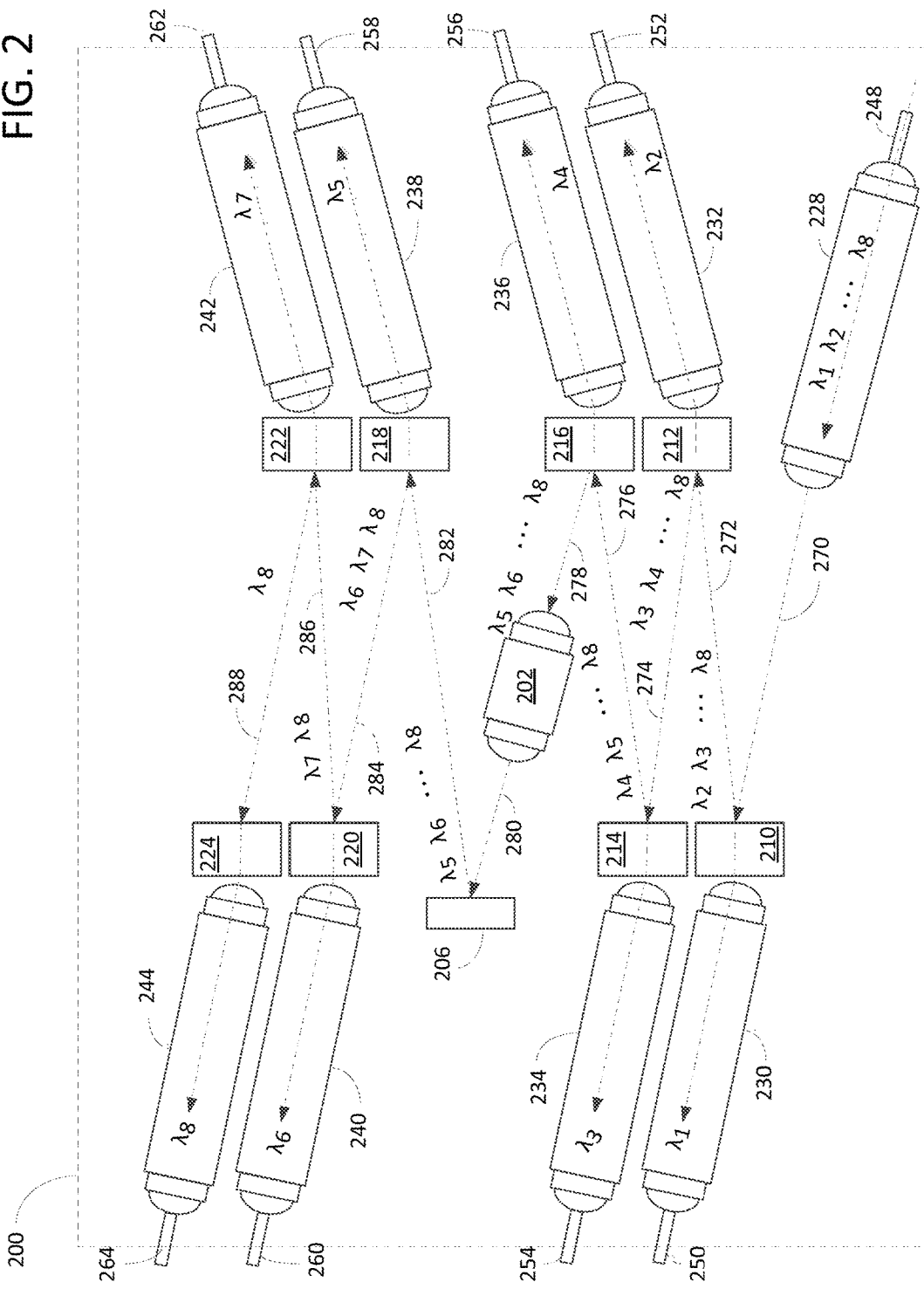

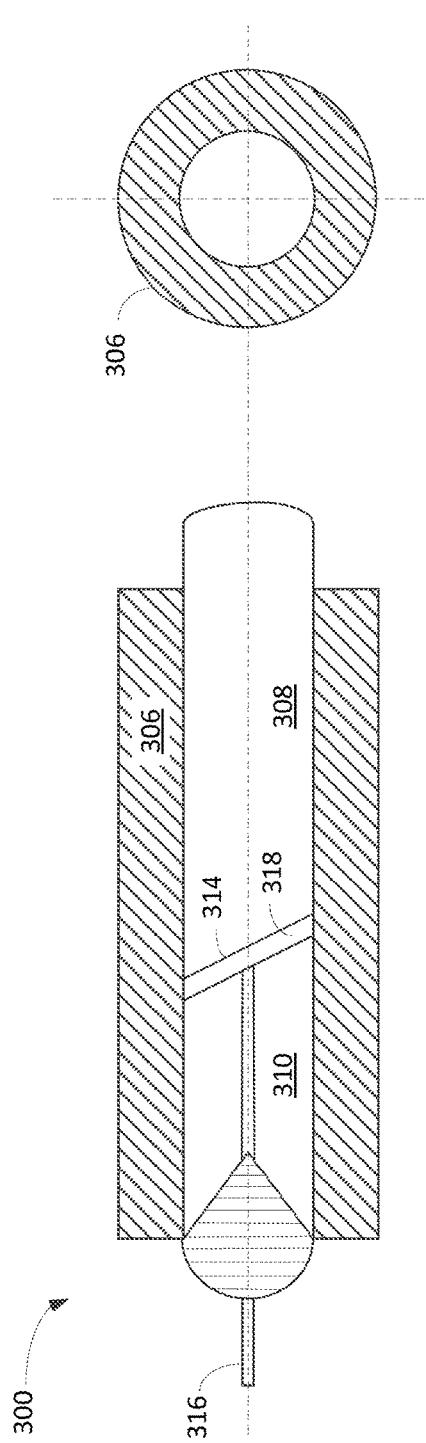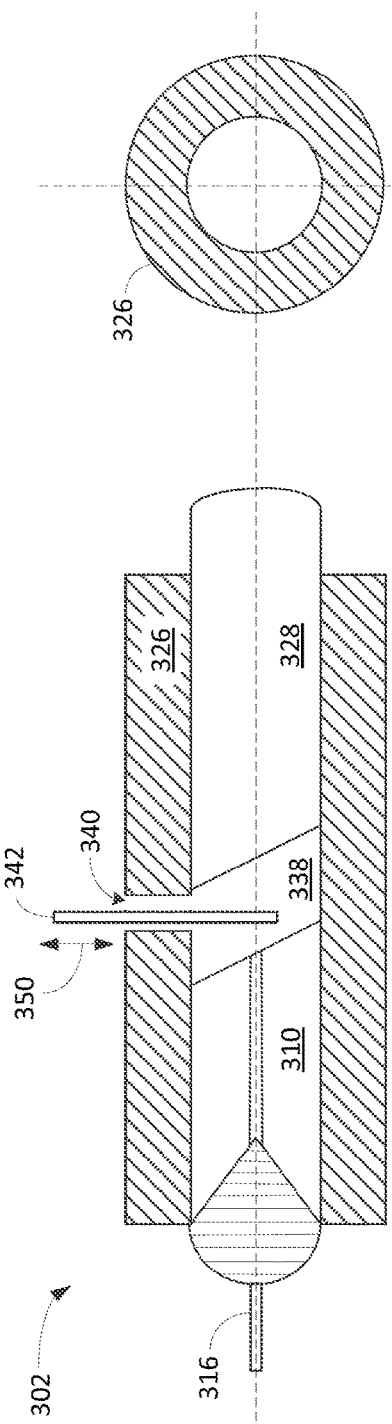

METHOD AND APPARATUS FOR PROVIDING MULTIPORT FREE-SPACE WAVELENGTH-DIVISION MULTIPLEXING (WDM) DEVICE USING A RELAY LENS

PRIORITY

This application is a continuation-in-part of and claims the benefit of priority to co-pending U.S. patent application having Ser. No. 14/852,543, filed on Sep. 12, 2015, in the same of the same inventor and entitled "Multiport Free-Space WDM Based On Relay Lens," which is a continuation-in-part of and claims the benefit of priority to co-pending U.S. patent application having Ser. No. 14/852,540, filed on Sep. 12, 2015, in the same of the same inventor and entitled "Assembly of Standard DWDM Devices for Use on Free-Space Multiport DWDM Devices," and co-pending U.S. patent application having Ser. No. 14/852,542, filed on Sep. 12, 2015, in the same of the same inventor and entitled "Optical Filter Subassembly for Compact Wavelength Demultiplexing Device," all mentioned co-pending U.S. applications are hereby incorporated herein by reference in their entirety.

FIELD

The exemplary embodiment(s) of the present invention relates to telecommunications network. More specifically, the exemplary embodiment(s) of the present invention relates to optical networking.

BACKGROUND

With increasing demand for more information to be supplied to homes and/or businesses, network providers are constantly adding, expanding, upgrading, and/or switching their networks to improve overall optical communications network(s). Optical communications networks typically offer high-speed voice, video, and data transmission between users, such as providers, residential homes, businesses, government agents, and/or networks. Conventional optical networks include, but not limited to, fiber to the node/neighborhood ("FTTN"), fiber to the curb ("FTTC"), fiber to the building ("FTTB"), fiber to the home ("FTTH"), fiber to the premises ("FTTP"), or other edge location to which a fiber network extends. With increasing speed and capacity, various optical devices such as wave-division multiplexing ("WDM") elements have been developed to manipulate optical signals, such as routing, splitting, merging, and/or dropping optical signals.

To route optical signals between various optical nodes or devices, a WDM system, for example, may be employed to handle optical signal routing. The WDM system, for certain applications, is able to multiplex a number of optical signals with different wavelengths onto a single optical fiber. A wavelength may also be referred as a frequency or a color capable of traveling across an optical fiber. Different wavelengths, for instance, can be generated by different lasers. With a WDM network environment, a typical fiber may be configured to carry multiple sets of network traffic using different traffic wavelengths. For instance, a fiber can be configured up to 88 channels wherein each channel can transmit a specific type of wavelength containing optical information.

In multiplexing of fiber optics, Arrayed waveguide gratings (AWG) are commonly used as optical multiplexers and/or de-multiplexers in WDM systems. For example, such devices are capable of multiplexing a large number of wavelengths into a single optical fiber whereby a single fiber can increase its transmission capacity considerably. The devices are based on a fundamental principle of optics and how light waves of different wavelengths can transmit information from interfering with each other. For example, if each channel in an optical communication network uses light of a slightly different wavelength from a neighboring channel, the light containing a large number of these channels can be carried by a single optical fiber with negligible crosstalk between the channels. To handle such channels, AWG's or thin-film filter ("TFF") based WDM device can be used to multiplex channels of multiple wavelengths onto a single optical fiber at the transmission end.

A problem associated with a typical passive WDM device is optical divergence before the optical data is processed.

SUMMARY

One embodiment of the present invention discloses a multiport free-space wavelength division multiplexing ("WDM") device capable of handling multiple optical signals carried in multiple wavelengths ("$\lambda_n$") using a relay lens to extend optical working distance of collimator(s). The WDM device includes an optical filter, collimator, optical relay, and a relay optical filter. The optical filter is able to receive an optical beam containing multiple $\lambda_n$ and subsequently extract a first wavelength ("$\lambda_1$") from $\lambda_n$. A second optical beam is formed by the remaining of $\lambda_n$. The collimator, in one example, receives $\lambda_1$ from the optical filter. Upon receiving the second optical beam, the optical relay collimates the second optical beam with minimal loss due to light divergence. The relay optical filter, in one aspect, is configured to receive the collimated second optical beam and redirects the collimated second optical beam to a predefined intended orientation.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

FIG. 1 is a block diagram illustrating an optical network using one or more WDM devices for transmitting optical data in accordance with one embodiment of the present invention;

FIG. 2 is a block diagram illustrating a WDM device or WDM block configured to separating multiple optical signals using a relay lens in accordance with one embodiment of the present invention;

FIGS. 3A-B are block diagrams illustrating one or more collimators used with a relay lens to process optical signals transmitted via a WDM network in accordance with one embodiment of the present invention;

DETAILED DESCRIPTION

Figure 4:
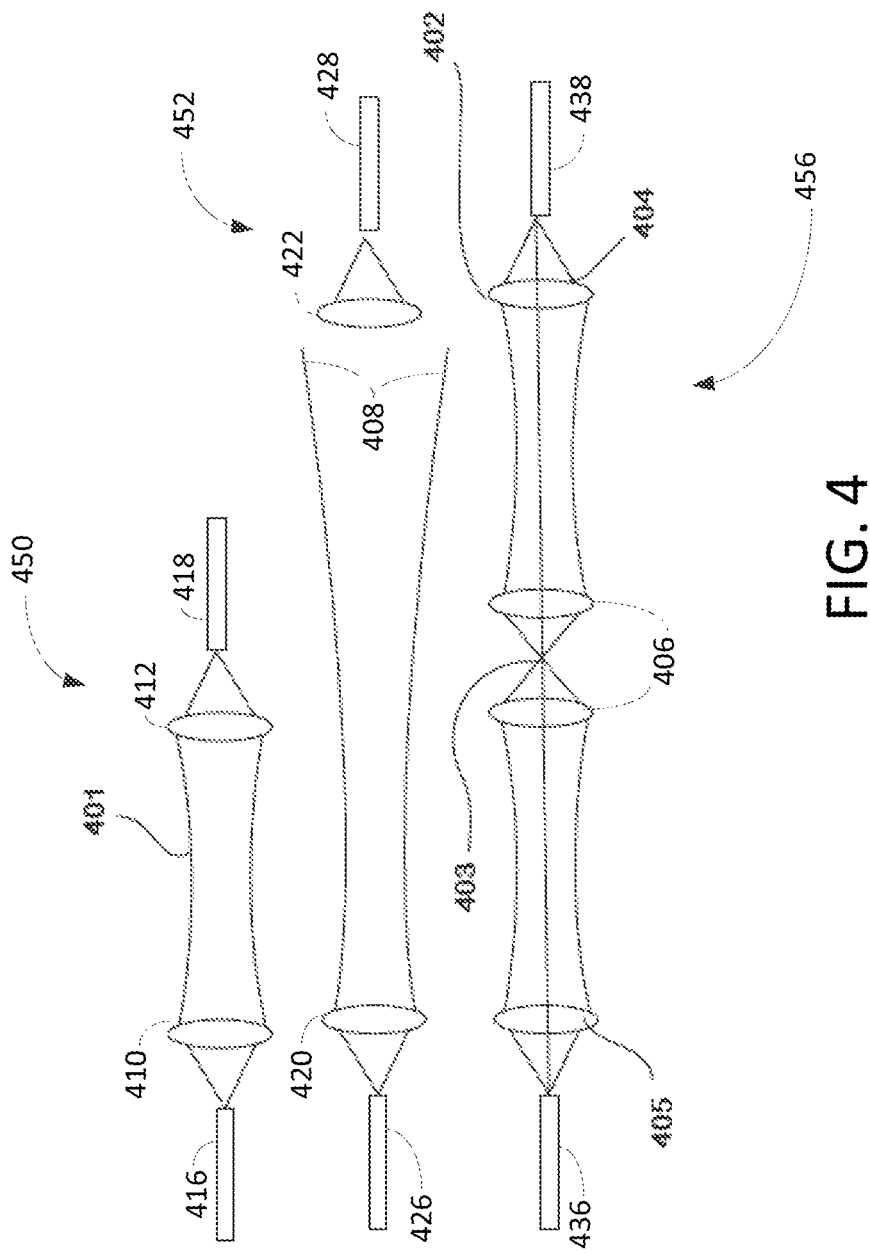
FIG. 4 are block diagrams illustrating working distance of a collimator and extending working distance using relay lens in accordance with one embodiment of the present invention.

Exemplary embodiment(s) of the present invention is described in context of a method and/or apparatus for node connectivity and port assignments relating to optical networking.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

Communication network means any type of network that is able to transmit data in a form of packets, cells, or frames. A communication network may be, for example, an IP communication network or an IP network carrying traffic packed in cells such as ATM (Asynchronous Transfer Mode) type, on a transport medium, for example, the TCP/IP or UDP/IP type. ATM cells are the result of decomposition (or segmentation) of packets of data, IP type, and those packets (here IP packets) comprise an IP header, a header specific to the transport medium (for example UDP or TCP) and payload data. The IP network may include one or more of a satellite network, a DVB-RCS (Digital Video Broadcasting-Return Channel System) network, an SDMB (Satellite Digital Multimedia Broadcast) network, a terrestrial network, a cable (xDSL) network or a mobile or cellular network (GPRS/EDGE, or UMTS (where applicable of the MBMS (Multimedia Broadcast/Multicast Services) type, the evolution of the UMTS known as LTE (Long Term Evolution), or DVB-H (Digital Video Broadcasting-Handhelds)), a hybrid (satellite and terrestrial) network, and/or an optical network.

In a WDM system, different colors of light, for example, are combined by a WDM multiplexing device and multiplexed onto a single fiber strand wherein each color of wavelength can be called a channel. Conversely on the receiving side, each color is separated into its own channel by using a WDM demultiplexing device. Thin film filters are used as optical filters to pass and/or reflect desired wavelengths. In one example, thin film filter based WDM's can be cascaded to obtain a higher-channel number, such as 4, 8, 16, and 32 channels.

One embodiment of the present invention discloses a multiport free-space wavelength division multiplexing ("WDM") device capable of handling multiple optical signals carried in multiple wavelengths ("$\lambda_n$") using a relay lens. The WDM device includes an optical filter, collimator, optical relay, and a relay optical filter. The optical filter is able to receive an optical beam containing multiple $\lambda_n$ and subsequently extract a first wavelength ("$\lambda_1$") from $\lambda_n$. A second optical beam is formed by the remaining of $\lambda_n$. The collimator, in one example, receives $\lambda_1$ from the optical filter. Upon receiving the second optical beam, the optical relay collimates the second optical beam with minimal loss due to light divergence. The relay optical filter, in one aspect, is configured to receive the collimated second optical beam and redirects the collimated second optical beam to a predefined intended orientation.

FIG. 1 is a block diagram 100 illustrating an optical network using one or more WDM devices for transmitting optical data in accordance with one embodiment of the present invention. Diagram 100 illustrates a WDM system which includes multiple transponders or optical devices 102-116, multiplexer ("mux") 120, de-multiplexer ("demux") 122, and fiber 126. The transponder, for example, is an optical device capable of sending and receiving optical data via a fiber. The optical devices includes, but not limited to, optical line terminals ("OLTs") and/or optical network units ("ONUs"). It should be noted that the underlying concept of the exemplary embodiment(s) of the present invention would not change if one or more blocks (or devices) were added to or removed from diagram 100.

The WDM network is an optical communication network capable of multiplexing multiple optical carrier ("OC") signals onto one fiber such as fiber 126 for transporting information from one or more sources to one or more destinations. To multiplex multiple OC signals, different wavelengths (i.e., colors) are multiplexed onto a single stream of optical light. The WDM network logically connects multiple nodes that are separated by geographic distances (i.e., network nodes) for network communication.

In one embodiment, mux 120 is an optical device configured to multiplexing multiple optical signals or wavelengths ("$\lambda n$") into one single light beam transmitted by a single fiber 126. Demux 122, on the other hand, is an optical device capable of separating or splitting optical signal(s) or wavelength $\lambda$ from the light beam which contains multiple optical signals or $\lambda n$. To properly extract designated wavelength(s) from the light beam, demux 122, in one aspect, includes one or more passive WDM blocks containing one or more relay lenses to separate optical signals represented by different $\lambda$ from the light beam. It should be noted that passive WDM block does not require a power supply to repower or refresh optical signals or light beam. It should be noted that depending on the applications, the relay lens can also be used on mux operation for extending the optical working distance. To simplify forgoing discussion, the operation(s) and device(s) relating the demux are described as exemplary illustrations of the presently claimed invention.

An advantage of using a passive WDM block having a relay lens is that it reduces the loss caused by beam coupling when port-count goes higher.

FIG. 2 is a block diagram illustrating a WDM device or block 200 configured to separating multiple optical signals using a relay lens in accordance with one embodiment of the present invention. WDM block 200 includes multiple collimators 228-244, TFFs 210-224, lens 202, and reflector 206. In one example, WDM block 200 includes one input port 248 and eight output ports 250-264. It should be noted that the underlying concept of the exemplary embodiment(s) of the present invention would not change if one or more components (or elements) were added to or removed from FIG. 2.

In one embodiment, WDM block 200, also known as an optical WDM device, includes a first optical filter or TFF 216, a first collimator or collimator 236, and an optical relay 202. During operation, first optical filter 216, in one example, receives a first optical beam 276 containing a set of wavelengths such as $\lambda_4, \lambda_5, \ldots \lambda_6$. A function of the optical filter 216 is able to extract a first wavelength such as $\lambda_4$ from the wavelengths to form a first light signal with $\lambda_4$. A second optical beam 278 containing $\lambda_5, \lambda_6, \ldots \lambda_8$ is subsequently formed in response to the remaining of the wavelengths of first optical beam 276. It should be noted that first optical filter 216 can be a thin-film filter capable of allowing a predefined wavelength to travel in one direction while allowing other wavelengths or the remaining of the first optical beam to travel in a second direction.

First collimator such as collimator 236, optically coupled to first optical filter 216, is configured to receive the first light signal or optical signal with $\lambda_4$ from first optical filter 216. In one example, first collimator 236 includes a fiber pigtail and a collimator lens which are not shown in FIG. 2. The fiber pigtail and the collimator lens are enclosed in a glass tube used for transmitting optical signals with minimal light loss.

Optical relay 202, in one embodiment, is optically coupled to first optical filter 216 and is capable of receiving second optical beam 278 from first optical filter 216. A function of optical relay 202 is to collimate second optical beam 278 to generate a collimated second optical beam 280 with minimal light divergence. Optical relay 202, in one embodiment, includes a C-lens based relay lens with a predefined angular gap wherein the C-lens is enclosed in a glass tube. A function of the C-lens is to collimate a light beam as it passes through the optical relay.

Alternatively, optical relay 202 is a ball-lens based relay lens with a predefined gap between the two ball-shaped lenses. In one example, the ball-shaped lenses are enclosed in a glass tube or a metal tube depending on the applications. A function of the ball-shaped lenses is to collimate a light beam as it passes through the optical relay.

Also, optical relay 202 can be a bi-concave-lens based relay lens with a predefined gap between the lenses. Depending on the applications, the bi-concave-lens is enclosed in a glass tube or a metal tube. A function of the bi-concave-lens is to collimate a light beam as the light passes through the relay lens.

Optical WDM device or WDM block 200, in one embodiment, includes a relay optical filter 206 and a second optical filter 218. Relay optical filter 206 which is optically coupled to optical relay 202, is a mirror or reflector configured to receive a collimated second optical beam 280 and redirecting collimated second optical beam to a different orientation as indicated by numeral 282. Second optical filter 218 capable of receiving collimated second optical beam 282 from relay optical filter 206 is able to separate a second wavelength such as $\lambda_5$ from collimated second optical beam 282. The remaining of the collimated second optical beam subsequently becomes a third optical beam 284. In one aspect, a second collimator 238 optically coupled to second optical filter 218 receives a second light signal with $\lambda_5$.

In operation, upon receipt of a light beam with a set of wavelengths $\lambda_1, \lambda_2 \ldots \lambda_8$ at input port 248, collimator 228 forward light beam 270 with $\lambda_1 \lambda_2 \ldots \lambda_8$ to optical filter 210. Optical filter 210 extracts $\lambda_1$ from light beam 270 and forwards $\lambda_1$ to collimator 230 which will output $\lambda_1$ via output port 250. Optical filter 210 redirects remaining light beam 272 with $\lambda_2 \lambda_3 \ldots \lambda_8$ to optical filter 212. Optical filter 212 extracts $\lambda_2$ from light beam 272 and forwards $\lambda_2$ to collimator 232 which will output $\lambda_2$ via output port 252. Optical filter 212 redirects the remaining light beam 274 with $\lambda_3 \lambda_4 \ldots \lambda_8$ to optical filter 214. Optical filter 214 extracts $\lambda_3$ from light beam 274 and forwards $\lambda_3$ to collimator 234 which will output $\lambda_3$ via output port 254. Optical filter 214 redirects remaining light beam 276 with $\lambda_4 \lambda_5 \ldots \lambda_8$ to optical filter 216. Optical filter 216 extracts $\lambda_4$ from light beam 276 and forwards $\lambda_4$ to collimator 236 which will output $\lambda_4$ via output port 256. Optical filter 216 redirects remaining light beam 278 with $\lambda_5 \ldots \lambda_8$ to optical relay 202 for re-collimation. After re-collimation, collimated light beam 280 is generated by optical relay 202. Upon reaching optical reflector 206, light beam 282 which is the same or similar to light beam 280 is forwarded or redirected to optical filter 218. Optical filter 218 extracts $\lambda_5$ from light beam 282 and forwards $\lambda_5$ to collimator 238 which will output $\lambda_5$ via output port 258. Optical filter 218 redirects remaining light beam 284 with $\lambda_6 \lambda_7 \lambda_8$ to optical filter 220. Optical filter 220 extracts $\lambda_6$ from light beam 284 and forwards $\lambda_6$ to collimator 240 which will output $\lambda_6$ via output port 260. Optical filter 220 redirects remaining light beam 286 with $\lambda_7 \lambda_8$ to optical filter 222. Optical filter 222 extracts $\lambda_7$ from light beam 286 and forwards $\lambda_7$ to collimator 242 which will output $\lambda_7$ via output port 262. Optical filter 222 redirects remaining light beam 288 with $\lambda_8$ to optical filter 224. Optical filter 224 extracts $\lambda_8$ from light beam 288 and forwards $\lambda_8$ to collimator 244 which will output $\lambda_8$ via output port 264.

Referring back to FIG. 2, relay lens 202 enables cascading multiple 1×4 WDM devices to form a 1×n WDM device where n can be a large integer. To simplify the forgoing description, 1×4 WDM device or block is used as an exemplary WDM block. It should be noted that 1×6, 1×8, or 1×16 WDM block can also be used in place of 1×4 WDM block.

If the application requires more ports, two 1×8 WDM devices, for example, can be cascaded to make one 1×16 WDM device. A benefit of using a relay lens is that the space on the base of the device can be saved by getting rid of fiber routing. Further, another benefit is that there is no need for fiber routing can coupling into the fiber. The relay lens system allows the port count to be doubled and there is no extra loss due to the free-space to fiber. In one aspect, 1×4 WDM device includes a first collimator which focuses a light beam through a thin film filter and into a second collimator. Light continues to pass through the remaining two collimators and into a relay lens. The focal point of two lenses in collimators coincides to avoid the insertion loss and focus the light beam into the second 1×4 WDM device. As light pass through the thin film filter such as optical filter 216 and collimator 236 of second 1×4 WDM device, the base or footprint can remain relatively smaller while two 1×4 WDM devices are cascaded to form one 1×8 WDM device.

One advantage of using TFF based WDM technology for separating light in fiber optics is that it provides better performance at low port count as well as lower cost. In addition, the TFF based WDM technology works passively and is more stable at operating temperature.

FIGS. 3A-B are block diagrams illustrating one or more collimators 300-302 used with a relay lens to process optical signals transmitted via a WDM network in accordance with one embodiment of the present invention. Collimator 300 includes a lens 308, a fiber pigtail 310, a gap 318, and a tube 306. Gap 318, in one example, is a gap with an eight (8) degree angle for reducing optical or light return loss. Collimator 300 further includes a fiber 316 which is used to receive or transmit light between the port and lens 308. Tube 306 can either be made of glass or metal depending on the application. It should be noted that the underlying concept of the exemplary embodiment(s) of the present invention would not change if one or more components (or elements) were added to or removed from diagram 300.

Collimator 302, in one embodiment, includes a lens 328, a fiber pigtail 310, a gap 338, and a tube 326. Gap 338, in one example, is a gap with a larger space with eight (8) degree angle wall for reducing optical or light return loss. In one aspect, collimator 302 includes an adjustable opening 340 that allows a thin glass 342 to be inserted into gap 338 for adjusting the focal point. Tube 326 can either be made of glass or metal depending on the application.

Collimator 300 or 302 which is also known as mini-fiber collimator includes lens 308 or 328 and fiber pigtail 310 that can be glued into a glass/metal tube 306 or 326. The adjustment of gap such as gap 338 between fiber end 316 and lens 328 can change the beam collimation. It should be noted that light beams maintain collimation for a certain distance which is called working distance. If a pair of collimators (as emitting and receive light) separation within the working distance, the coupling loss is relatively small. Beyond the working distance, the coupling loss will increase substantially. Note that low or minimal optical loss is desirable. It should be noted that working distance can be adjusted in certain range, but it eventually limited by the lens (both the diameter and thickness). For all compact devices, small size is required. For example, a lens with diameter of 1 mm (millimeter) or less has the longest working distance about 60-80 mm.

FIG. 4 are block diagrams 450-456 illustrating working distance of a collimator and extending working distance using relay lens in accordance with one embodiment of the present invention Diagram 450 illustrates a scenario that two lenses 410-412 and two fibers 416-418 are situated within the working distance 401 whereby minimal light loss is achieved. Diagram 452 illustrates a scenario that two lenses 420-422 and two fibers 426-428 are situated outside of working distance whereby great light loss has occurred as indicated by numeral 408. Diagram 456 illustrates a scenario that two lenses 404-405 and two fibers 436-438 are situated outside of working distance but linked by a relay lens 406 whereby a minimal light loss has been achieved.

One embodiment of the present invention uses relay system to transfer the light from one region to another. When within the working distance, light can pass the TFF's and follow the zig zag path eventually coupled to optical fibers without substantial light or photon loss. Note that the light loss depends on the working distance of collimator as indicated by numeral 401. Within the working distance, light can pass through collimator, but when the light path length is over the collimator working distance, light or photon loss occurs. In one aspect, a two-lens relay system can be used to double the optical path length or working distance without a high coupling loss. A relay lens 406 can be applied in between two collimators 404 and 405 to create a co-focal point between the two collimators 404 and 405. A relay lens 406 repeats a collimated beam to double and triple the working distance. In addition, with the use of a relay lens, the coupling loss can be reduced.

Figure 5A:
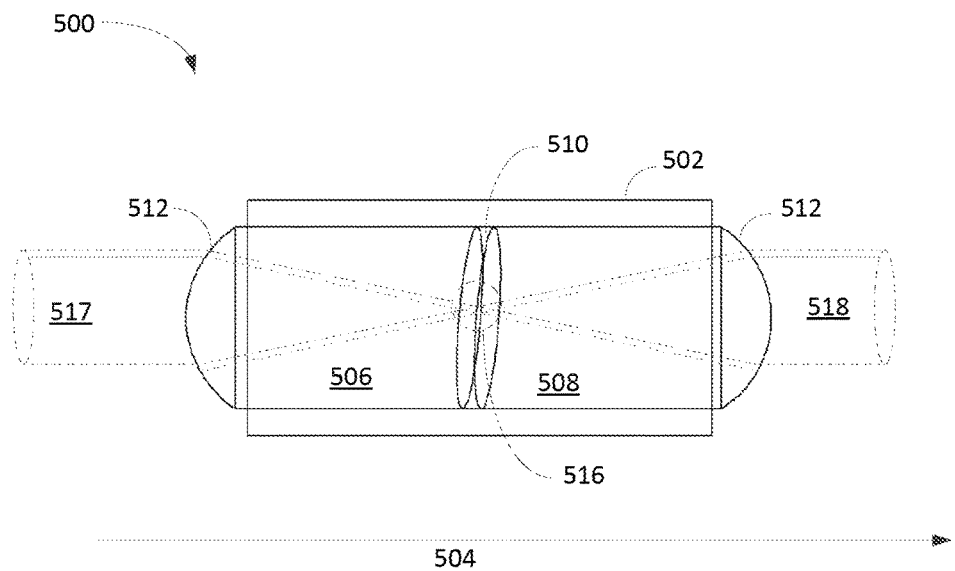
FIGS. 5A-B are diagrams illustrating alternative configurations of relay lens in accordance with one embodiment of the present invention.

FIG. 5A is a diagram illustrating a C-lens based relay lens 500 using a pair of C-lens 506-508 for light collimation in accordance with one embodiment of the present invention. The C-lens, in one example, includes one or more plano-concave lens capable of increasing focal lengths used for fiber collimators. A function of the C-lens is able to facilitate to focus a beam incident on a concave surface of the lens to a point beyond the optical element.

Relay lens 500 includes two C-lens 506-508, a glass tube 502, and a gap 510. In one aspect, C-lens 506-508 are orientated in such a way that both concave ends 512 of C-lens 506-508 are facing outward allowing a focal point 516 occurred in gap 510. During operation, when a light beam 517 travels in a direction indicated by arrow 504, light beam 517 is collimated to produce a collimated light beam 518 via focal point 516.

C-lens based relay lens 500, in one aspect, is used to extend the optical working distance. For example, when cascading two 1×4 WDM blocks to form 1×8 WDM device, a C-Lens based relay lens can be used to combine the two blocks. Relay lens 500 facilitates increasing in port count without substantially enlarging the working distance of fiber collimators as well as avoid using larger size of optical parts.

Two C lenses 506-508 are positioned with a particular gap 510 in a glass or metal tube 602. Each of the two lenses can be adjusted to fit with an appropriate distance so that the focal points of both C lenses coincide at focal point 516. When the focal points of both C lenses coincide, the working distance of the fibers become less and the overall footprint for combining two or more 1×4 WDM devices is minimized.

One advantage of using a C-lens based relay lens 500 is that it can keep the overall footprint of the assembly relatively smaller. With collimation by the relay lens, the working distance can be relatively smaller whereby the extra insertion loss is minimized. It should be noted that the insertion loss can be defined as a loss associated with signal power due to attached device(s) and transmission line(s) or fiber(s).

Figure 5B:
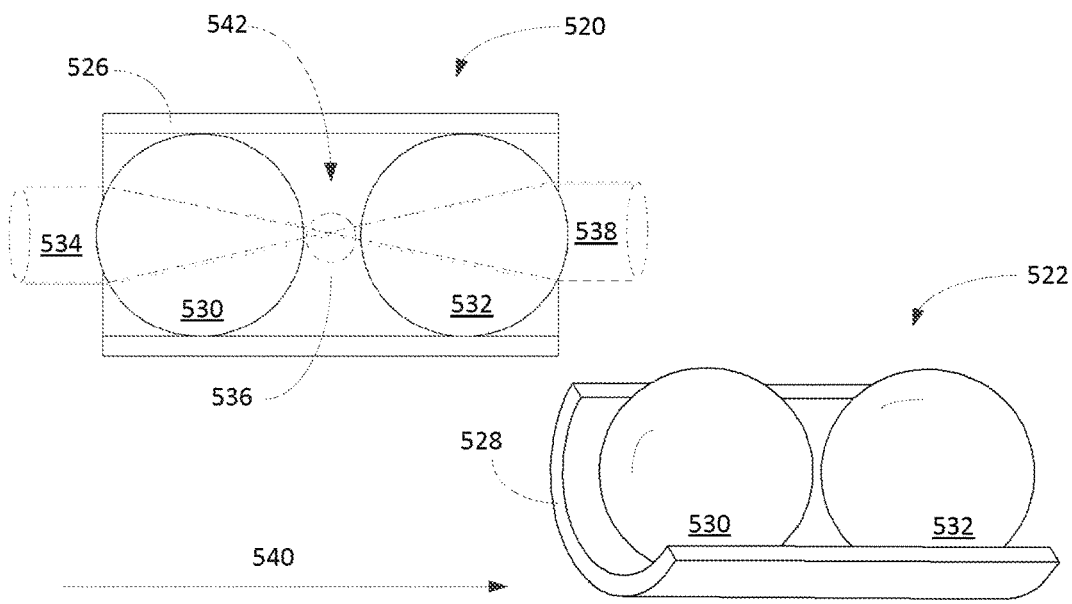

FIG. 5B is a diagram illustrating alternative configuration of a ball-lens based relay lens 520-522 using two-ball shaped lenses or ball-lens in accordance with one embodiment of the present invention. Relay lens 520 includes two ball-shaped lenses or two ball lenses 530-532, a glass or metal tube 526, and a gap 542. In one aspect, ball lenses 530-532 are orientated in such a way that both focal points of lenses 530-532 are aligned at point 536 in gap 542. During operation, when a light beam 534 travels in a direction indicated by arrow 540, light beam 534 is collimated to produce a collimated light beam 538 via focal point 536. It should be noted that the underlying concept of the exemplary embodiment(s) of the present invention would not change if one or more components (or elements) were added to or removed from FIG. 5B.

When cascading a 1×4 WDM block to form a 1×8 WDM device, a ball-lens based relay lens 520 can be used to combine the two 1×4 WDM blocks into one 1×8 WDM device. One advantage of using ball-lens based relay lens 520 is that it allows to be assembled onto the base of WDM device and keeps the overall footprint of the assembly relatively smaller. With collimation by the relay lens, the working distance can be relatively smaller whereby the insertion loss is minimized.

Two ball-lens shaped lenses 530-532 are positioned with a particular gap 542 in a glass or metal tube 542. Both lenses 530-532 can be adjusted to fit to an appropriate distance so that the focal points the lenses coincide for facilitating light collimation. When the focal points of the lenses coincide, the beam after relay lens repeats itself and such to extend the work distance, and thus the increase port count does not cause a substantial increase of coupling loss.

Relay lens 522 is essentially the same as relay lens 520 except that relay lens 522 is a three-dimensional ("3D") diagram with half tube 528. An advantage of using a half tube 528 is to simplify the assembly process.

Figure 6A:
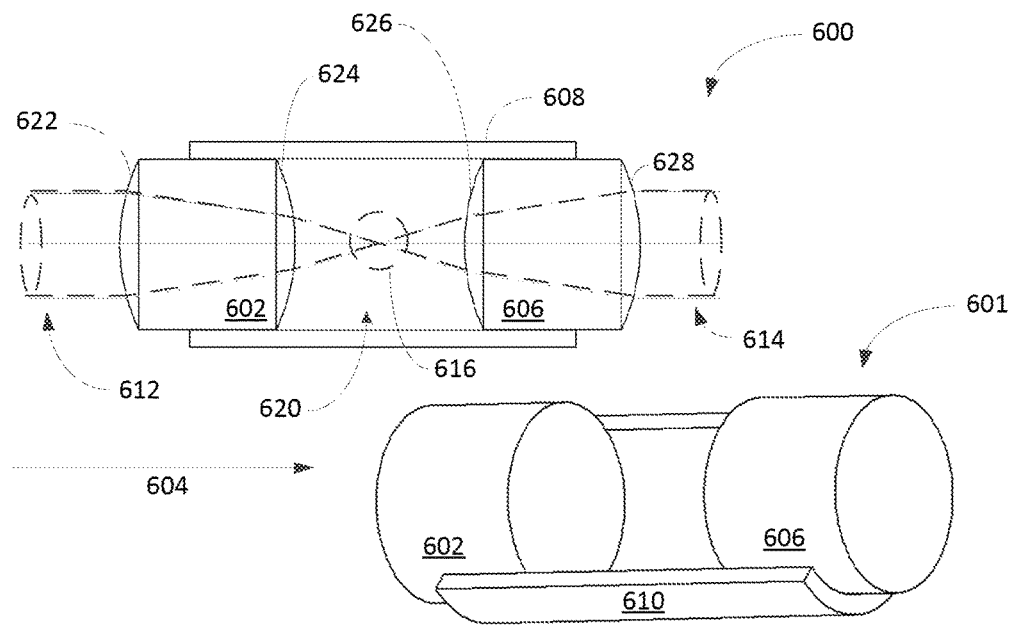
FIGS. 6A-B are diagrams illustrating relay lens and lens support in accordance with one embodiment of the present invention.

FIG. 6A is a diagram illustrating a bi-concave ("BC") lens based relay lens 600 using two BC lenses 602-606 in accordance with one embodiment of the present invention. Relay lens 600 includes two BC lenses 602-606, a glass or metal tube 608, and a gap 620. In one aspect, BC lens 602-606 are orientated in such a way that concave sides 622-628 of BC lenses 602-606 are situated allowing a focal point 616 to be aligned in gap 620. During operation, when a light beam 612 travels in a direction indicated by arrow 604, light beam 612 is collimated to produce a collimated light beam 614 via focal point 616. It should be noted that the underlying concept of the exemplary embodiment(s) of the present invention would not change if one or more components (or elements) were added to or removed from FIG. 6A.

In application, BC lens based relay lens 600 can be used to cascade two 1×4 WDM devices to produce one 1×8 WDM device. Two BC lenses 602-606 are positioned with a particular gap 620 in a glass or metal tube 608. Both lenses 602-606 can be adjusted to fit to an appropriate distance so that the focal points the lenses are coincided for facilitating light collimation. When the focal points of the lenses are aligned, the working distance for light operation can be extended, and thus the increase port count does not cause a substantial increase of coupling loss.

Relay lens 601 is essentially the same as relay lens 600 except that relay lens 601 is a 3D diagram with half tube 610. An advantage of using a half tube 610 is to simplify the assembly process.

Figure 6B:
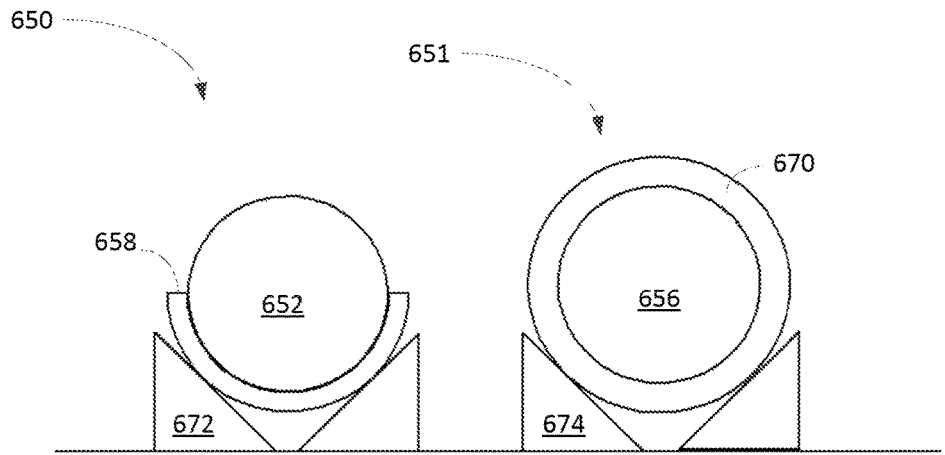

FIG. 6B is a diagram illustrating lens supports 650-651 in accordance with one embodiment of the present invention. Support 650 includes a lens 652, half tube 658, and triangular blocks 672. Support 651 includes a lens 656, tube 670, and triangular blocks 674. A glass triangular block 672 or 674 can be used to house glass tube 658 or 670 which are used to anchor lenses 652 or 656 to a frame or base, not shown in FIG. 6B. Two glass triangular blocks 672 can be mounted to the base plate. A glass tube 658 can be mounted to triangular blocks 672. Note that using block 672 or 674 to mount glass tube 658 provides certain degree of alignment freedom. During fabrication, the relay lenses need to be fine-tuned for angle coordination to ensure that the focal points are aligned. For example, a cylindrical shape of relay lens plus the glass triangular block combination can be mounted in such a way that provides both freedoms of coordination and angle adjustment. Once the position of the relay lenses is fixed to the desired location, they will be mounted permanently. It should be noted that blocks 672 or 674 can be made of glass or metal or a combination of glass and metal depending on the applications.

Figure 7A:
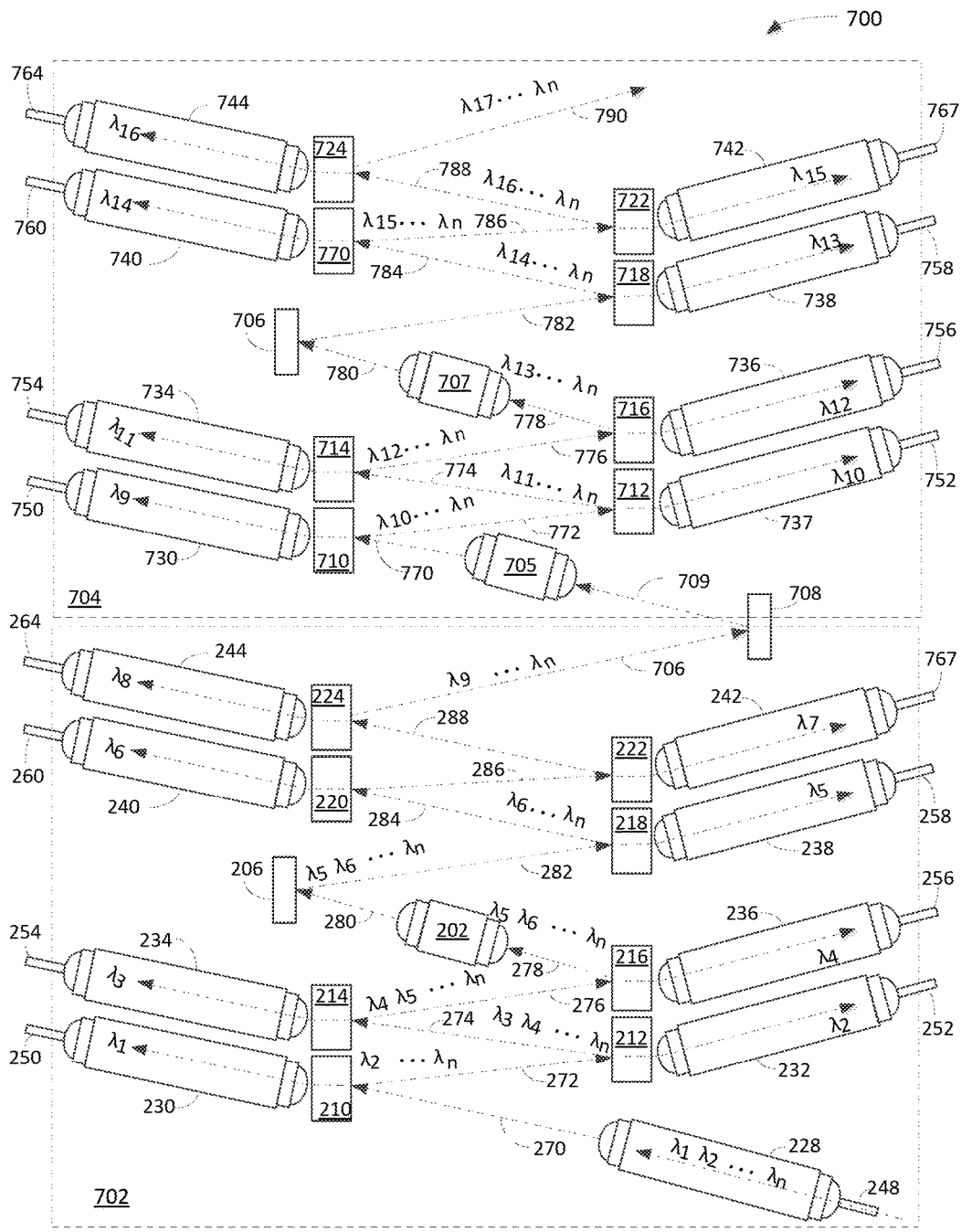
FIGS. 7A-B are diagrams illustrating an exemplary embodiment of WDM block containing one or more relay lenses in accordance with one embodiment of the present invention.

FIG. 7A is a diagram 700 illustrating an exemplary embodiment of WDM block containing one or more relay lenses in accordance with one embodiment of the present invention. Diagram 700 illustrates a cascade configuration of two WDM blocks 200, shown in FIG. 2, to form a combined WDM block containing one input port and 16 output ports using multiple relay lenses. It should be noted that the underlying concept of the exemplary embodiment(s) of the present invention would not change if one or more components (or elements) were added to or removed from diagram 700.

WDM block 702 is the same or similar to WDM block 200, shown in FIG. 2, except that WDM block 702 includes a second reflector 708 used to forwarding the remaining light beam containing $\lambda_9 \ldots \lambda_n$ to WDM block 704. It should be noted that reflector 708 can also be placed in WDM block 704. WDM block 704 is similar to WDM block 200 except that WDM block 704 contains a relay lens 705 instead of collimator 228. It should be further noted that the configuration illustrated in diagram 700 can be expended into more than two WDM blocks.

WDM block 702, in one aspect, includes multiple collimators 228-244, TFFs 210-224, lens 202, and reflector 206. WDM block 702 includes one input port 248 and eight output ports 250-264. Since the operation in WDM block 702 is similar to WDM block 200, shown in FIG. 2, the detail process is not described here.

WDM block 704, in one aspect, includes multiple collimators 730-744, TFFs 710-724, lenses 705-707, and reflector 706. WDM block 704, in one embodiment, includes one internal input port to receive light beam 709 and eight output ports 750-764. Reflector 708 is one exemplary way of coupling WDM block 704 to WDM block 702. It should be noted that other types of optical coupling device(s) can also be employed, such as, but not limited to, collimator(s), mirror(s), optical filters, prisms, and the like.

In operation, upon receipt of a light beam 709 with a set of wavelengths $\lambda_9\ \lambda_{10} \ldots \lambda_n$ from reflector 708, relay lens 705 collimates light beam 709 to produce collimated light beam 770 forwarding to optical filter 710. Optical filter 710 extracts $\lambda_9$ from light beam 770 and forwards $\lambda_9$ to collimator 730 which will output $\lambda_9$ via output port 750. Optical filter 710 redirects remaining light beam 770 with $\lambda_{10} \ldots \lambda_n$ to optical filter 712. Optical filter 712 extracts $\lambda_{10}$ from light beam 772 and forwards $\lambda_2$ to collimator 732 which will output $\lambda_{10}$ via output port 752. Optical filter 712 redirects remaining light beam 772 with $\lambda_{11} \ldots \lambda_n$ to optical filter 714. Optical filter 714 extracts $\lambda_{11}$ from light beam 774 and forwards $\lambda_{11}$ to collimator 734 which will output $\lambda_{11}$ via output port 754. Optical filter 714 redirects remaining light beam 776 with $\lambda_{12} \ldots \lambda_n$ to optical filter 716. Optical filter 716 extracts $\lambda_{12}$ from light beam 776 and forwards $\lambda_{12}$ to collimator 736 which will output $\lambda_{12}$ via output port 756. Optical filter 716 redirects remaining light beam 778 with $\lambda 13 \ldots \lambda n$ to optical relay 707 for re-collimation. After re-collimation, collimated light beam 780 is generated by optical relay 707. Upon reaching optical reflector 706, optical reflector 706 forwards or redirects light beam 782 which is the same or similar to light beam 780 to optical filter 718. Optical filter 718 extracts $\lambda_{13}$ from light beam 782 and forwards $\lambda_{13}$ to collimator 738 which will output $\lambda_{13}$ via output port 758. Optical filter 718 redirects remaining light beam 784 with $\lambda_{14} \ldots \lambda_n$ to optical filter 720. Optical filter 720 extracts $\lambda_{14}$ from light beam 784 and forwards $\lambda_{14}$ to collimator 740 which will output $\lambda_{14}$ via output port 760.

Optical filter 720 redirects remaining light beam 786 with $\lambda_{15} \ldots \lambda_n$ to optical filter 722. Optical filter 722 extracts $\lambda_{15}$ from light beam 786 and forwards $\lambda_{15}$ to collimator 742 which will output $\lambda_{15}$ via output port 762. Optical filter 722 redirects remaining light beam 788 with $\lambda_{16} \ldots \lambda_n$ to optical filter 724. Optical filter 724 extracts $\lambda_{16}$ from light beam 788 and forwards $\lambda_{16}$ to collimator 744 which will output $\lambda_{16}$ via output port 764. It should be noted that light beam 790 can continue if another WDM block is coupled or cascaded to WDM block 704.

Figure 7B:
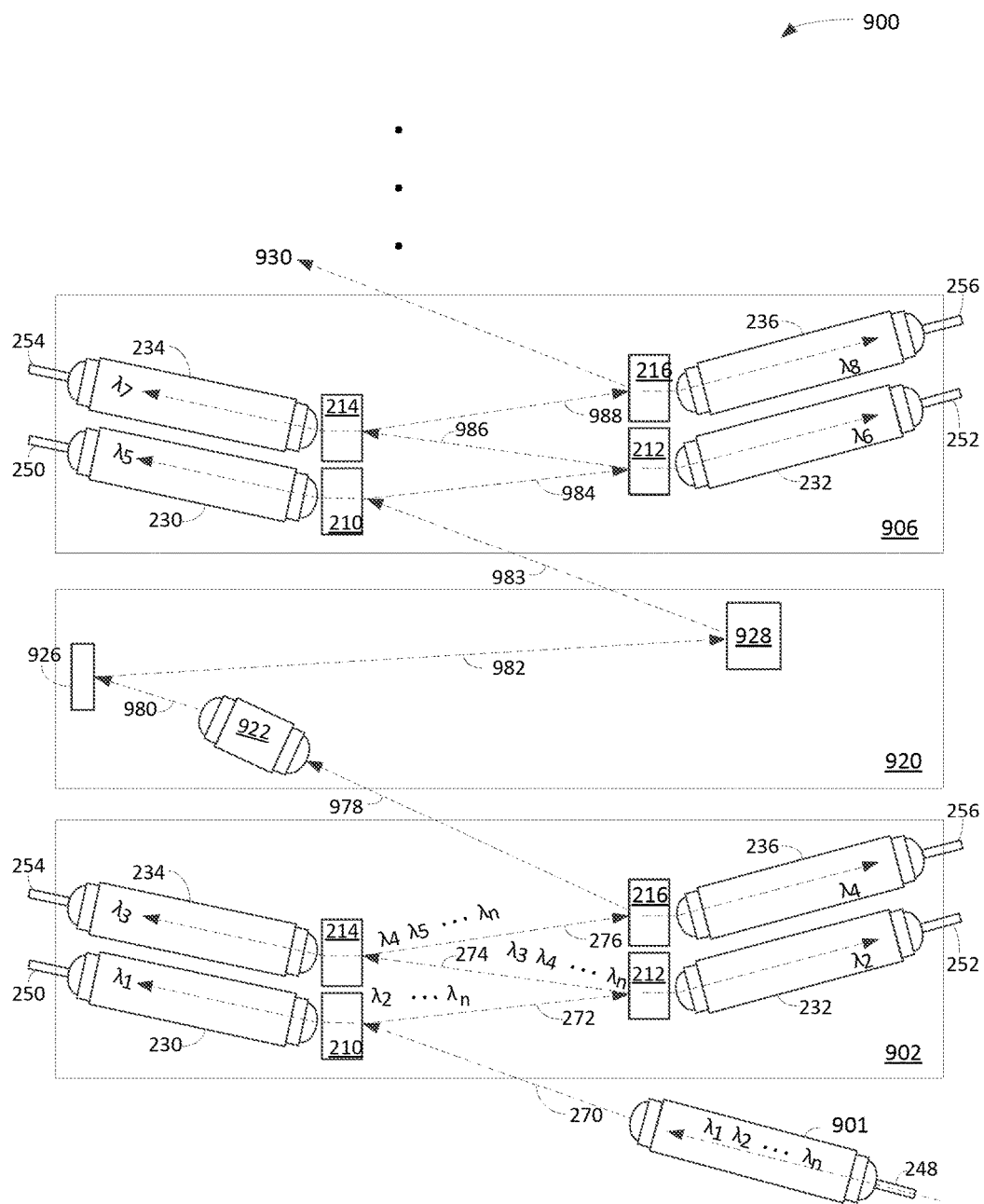

FIG. 7B is a diagram 900 illustrating an exemplary embodiment of WDM blocks using modular assembly containing one or more relay blocks in accordance with one embodiment of the present invention. Diagram 900 illustrates an input collimator 901, two 1×4 WDM blocks 902-906 and a relay block 920. In one embodiment, 1×4 WDM blocks 902-904 are the same or similar blocks. It should be noted that 1×4 WDM block is an exemplary WDM block and 1×8 WDM block, for instance, can also be used in place of 1×4 WDM block. It should be noted that the underlying concept of the exemplary embodiment(s) of the present invention would not change if one or more components (or elements) were added to or removed from diagram 900.

Collimator 901, which is similar or the same as collimator 228 shown in FIG. 2, is able to receive an input optical beam from input port 248 wherein the optical beam includes $\lambda_1 \lambda_2 \ldots \lambda_n$. In operation, collimator 901 forwards light beam 270 with $\lambda_1 \lambda_2 \ldots \lambda_n$ to optical filter 210 in WDM block 902. It should be noted that collimator 901 can be substituted with any other optical input devices.

WDM block 902 or 906 is a 1×4 WDM block having four (4) collimators 230-236 and four (4) optical filters 210-216. Each collimator such as collimator 230, in one embodiment, is able to extract a predefined wavelength(s) and forward the extracted wavelength to its output port. Each optical filters such as filter 210 can be a thin-film filter capable of separating one wavelength from the optical beam and subsequently forwarding the remaining optical beam (minus the extracted beam) to the next optical filter.

Relay block 920 includes a relay lens 922 and two optical reflectors 926-928. It should be noted that reflectors 926-928 can be mirrors, lenses, TFF, or the like. A function of relay block 920 is to couple two WDM blocks such as 1×4 WDM blocks 902-906 to form a 1×8 WDM block. Noted that multiple relay blocks such as block 920 can be used to couple more WDM blocks. It should be further noted that additional optical filers and relay lenses may be included in relay block 920 to enhance coupling capabilities.

An advantage of using modular coupling method for connecting WDM blocks with relay blocks is that it facilitates increasing in port count using a process of modular assembly.

The exemplary embodiment of the present invention includes various processing steps, which will be described below. The steps of the exemplary embodiment of the present invention may be embodied in machine or computer executable instructions. The instructions can be used to cause a general purpose or special purpose system, which is programmed with the instructions, to perform the steps of an exemplary embodiment of the present invention. While embodiments of the present invention will be described with reference to the DWDM network, the method and apparatus described herein is equally applicable to other network infrastructures or other data communications environments.

Figure 8:
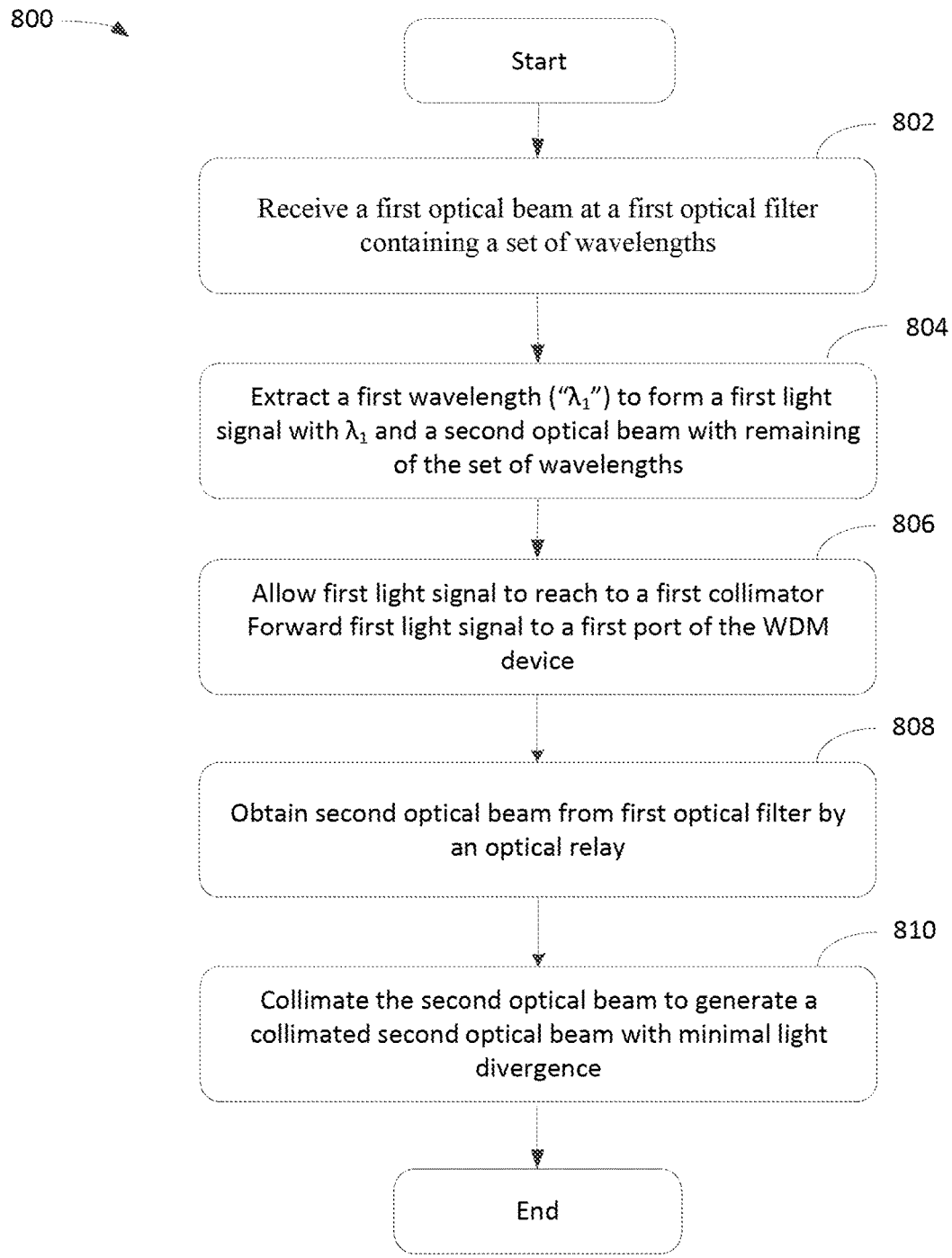
FIG. 8 is a flowchart illustrating an exemplary process of separating a specific optical wavelength from a light beam using a relay lens in accordance with one embodiment of the present invention.

FIG. 8 is a flowchart 800 illustrating an exemplary process of separating a specific optical wavelength from a light beam using a relay lens in accordance with one embodiment of the present invention. At block 802, a process of collimating optical light for a WDM device receives a first optical beam at a first optical filter containing a group of wavelengths. At block 804, after extracting a first wavelength ("$\lambda_1$") from the wavelengths to form a first light signal with $\lambda_1$, a second optical beam is formed with the remaining of the wavelengths. At block 806, the first light signal is allowed to pass through the first optical filter reaching to a first collimator and the first light signal is forwarded by the first collimator to a first port of the WDM device. At block 808, the second optical beam is obtained via a free space from the first optical filter by an optical relay. At block 810, after collimating the second optical beam to generate a collimated second optical beam with minimal light divergence, the collimated second optical beam is redirected to a different orientation when the collimated second optical beam arrives at a relay optical filter. In one embodiment, upon receiving the collimated second optical beam at a second optical filter containing a set of wavelengths, a second wavelength $\lambda_2$ is extracted from the set of wavelengths to form a second light signal with $\lambda_2$ and forming a third optical beam with the remaining of the set of wavelengths.

While particular embodiments of the present invention have been shown and described, it will be obvious to those skilled in the art that, based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. An optical wavelength-division multiplexing ("WDM") device, comprising:
 a first optical filter, able to receive a first optical beam containing a first plurality of wavelengths, configured to extract a first wavelength ("$\lambda_1$") from the first plurality of wavelengths to form first light signal with $\lambda_1$ and form a second optical beam with remaining of the first plurality of wavelengths;
 a first collimator coupled to the first optical filter and configured to receive the first light signal with the $\lambda_1$ from the first optical filter;
 a second optical filter, configured to receive the second optical beam, operable to extract a second wavelength ("$\lambda_2$") from a second plurality of wavelengths from the second optical beam to form second light signal with $\lambda_2$ and form a third optical beam with remaining of the second plurality of wavelengths;
 a third optical filter, configured to receive the third optical beam, operable to extract a third wavelength ("$\lambda_3$") from a third plurality of wavelengths from the third optical beam to form third light signal with $\lambda_3$ and form a fourth optical beam with remaining of the third plurality of wavelengths;
 a fourth optical filter, configured to receive the fourth optical beam, operable to extract a fourth wavelength ("$\lambda_4$") from a fourth plurality of wavelengths from the fourth optical beam to form fourth light signal with $\lambda_4$ and form a fifth optical beam with remaining of the fourth plurality of wavelengths; and
 an optical relay, optically coupled to the fourth optical filter, configured to receive the fifth optical beam from the fourth optical filter and configured to collimate the fifth optical beam to generate a collimated second optical beam.

2. The optical WDM device of claim 1, further comprising a relay optical filter, coupled to the optical relay, configured to receive the collimated second optical beam and redirecting the collimated second optical beam to a different orientation.

3. The optical WDM device of claim 2, further comprising a fifth optical filter, receiving the collimated second optical beam from the relay optical filter, configured to separate a fifth wavelength ("$\lambda_5$") from the collimated second optical beam to form fifth light signal with $\lambda_5$ and form a sixth optical beam with remaining of the collimated second optical beam.

4. The optical WDM device of claim 2, further comprising a fifth collimator coupled to the fifth optical filter and configured to receive the fifth light signal with the $\lambda_5$.

5. The optical WDM device of claim 3, further comprising a second collimator coupled to the second optical filter and configured to receive the second light signal with the $\lambda_2$.

6. The optical WDM device of claim 1, wherein the first optical filter is a thin-film filter capable of allowing a predefined wavelength to travel in one direction and allowing remaining of the first optical beam to travel in second direction.

7. The optical WDM device of claim 1, wherein the first collimator includes a fiber pigtail and a collimator lens wherein the fiber pigtail and the collimator lens are enclosed by a glass tube configured to transmit optical signals.

8. The optical WDM device of claim 1, wherein the optical relay includes a C-lens based relay lens with a predefined angular gap enclosed in a glass tube and configured to collimate a light beam passing through the optical relay.

9. The optical WDM device of claim 1, wherein the optical relay includes a ball-lens based rely lens with a predefined gap enclosed in a glass tube and configured to collimate a light beam passing through the optical relay.

10. The optical WDM device of claim 1, wherein the optical relay includes a bi-concave-lens based relay lens with a predefined gap enclosed in a glass tube and configured to collimate a light beam passing through the optical relay.

11. A method of collimating optical light for a wavelength-division multiplexing ("WDM") device, comprising:
receiving a first optical beam at a first optical filter containing a plurality of wavelengths and extracting a first wavelength ("$\lambda_1$") from the plurality of wavelengths to form a first light signal with $\lambda_1$ and forming a second optical beam with remaining of the plurality of wavelengths;
allowing the first light signal to pass through the first optical filter reaching to a first collimator and forwarding the first light signal by the first collimator to a first port of the WDM device;
receiving the second optical beam at a second optical filter and extracting a second wavelength ("$\lambda_2$") from the second optical beam to form a second light signal with $\lambda_2$ and forming a third optical beam with remaining of the plurality of wavelengths;
allowing the second light signal to pass through the second optical filter reaching to a second collimator and forwarding the second light signal by the second collimator to a second port of the WDM device;
receiving the third optical beam at a third optical filter and extracting a third wavelength ("$\lambda_3$") from the third optical beam to form a third light signal with $\lambda_3$ and forming a fourth optical beam with remaining of the plurality of wavelengths; and
obtaining the fourth optical beam via a free space from the third optical filter by an optical relay and collimating the fourth optical beam to generate a collimated fourth optical beam.

12. The method of claim 11, further comprising redirecting the collimated fourth optical beam to a different orientation when the collimated fourth optical beam arrives at a relay optical filter.

13. The method of claim 12, further comprising receiving the collimated fourth optical beam at a fourth optical filter containing a plurality of wavelengths and extracting a fourth wavelength ("$\lambda_4$") from the plurality of wavelengths to form a fourth light signal with $\lambda_4$ and forming a fifth optical beam with remaining of the plurality of wavelengths.

14. The method of claim 11, further comprising receiving the fifth optical beam at a fifth optical filter from the fifth optical filter and separating a fifth wavelength ("$\lambda_5$"] from the fifth optical beam to form fifth light signal with $\lambda_5$ and form a sixth optical beam with remaining of the fifth optical beam.

15. The method of claim 13, further comprising receiving the second light signal with the $\lambda_2$ by a second collimator and facilitating to forward the second light signal to a second port of the WDM device.

16. The method of claim 11, further comprising allowing the third light signal to pass through the third optical filter reaching to a third collimator and forwarding the third light signal by the third collimator to a third port of the WDM device.

17. An optical wavelength-division multiplexing ("WDM") device, comprising:
a first optical filter, obtaining a first plurality of wavelengths containing at least $\lambda_1$, $\lambda_2$, $\lambda_3$, $\lambda_4$, and $\lambda_5$, configured to separate the $\lambda_1$ from the first plurality of wavelengths and generate a second plurality of wavelengths with remaining of the first plurality of wavelengths;
a second optical filter, obtaining the second plurality of wavelengths, configured to separate the $\lambda_2$ from the second plurality of wavelengths to form second light signal with $\lambda_2$ and generate a third plurality of wavelengths with remaining of the second plurality of wavelengths;
a third optical filter, obtaining the third plurality of wavelengths, configured to separate the $\lambda_3$ from the third plurality of wavelengths to form third light signal with $\lambda_3$ and generate a fourth plurality of wavelengths with remaining of the third plurality of wavelengths;
a fourth optical filter, obtaining the fourth plurality of wavelengths, configured to extract the $\lambda_4$ from the fourth plurality of wavelengths to form fourth light signal with $\lambda_4$ and generate a fifth plurality of wavelengths with remaining of the fourth plurality of wavelengths; and
an optical relay, optically coupled to the fourth optical filter, configured to receive the fifth plurality of wavelengths and configured to collimate the fifth optical beam to generate a collimated fifth optical beam.

18. The optical WDM device of claim 17, further comprising a first collimator coupled to the first optical filter and configured to receive the $\lambda_1$ from the first optical filter.

19. The optical WDM device of claim 18, wherein the first collimator forwards the $\lambda_1$ to a first port of the WDM device.

20. The optical WDM device of claim 17, further comprising a relay optical filter, coupled to the optical relay, configured to receive the collimated fifth optical beam and redirecting the collimated second optical beam to a different orientation.

21. The optical WDM device of claim 17, further comprising a fifth optical filter, receiving the collimated fifth optical beam from the relay optical filter, configured to separate the $\lambda_5$ from the collimated first optical beam to form fifth light signal with $\lambda_5$ and form a sixth plurality of wavelengths with remaining of the collimated fifth optical beam.

22. The optical WDM device of claim 17, further comprising a second collimator coupled to the second optical filter and configured to receive the $\lambda_2$ from the second optical filter.

23. The optical WDM device of claim 22, wherein the second collimator forwards the $\lambda_2$ to a second port of the WDM device.

24. The optical WDM device of claim 21, further comprising a fifth collimator coupled to the fifth optical filter and configured to receive the fifth light signal with the $\lambda_5$.

25. The optical WDM device of claim 24, wherein the fifth collimator forwards the $\lambda_5$ to a fifth port of the WDM device.

26. The optical WDM device of claim 17, wherein the first optical filter is a thin-film filter capable of allowing a predefined wavelength to travel in one direction and allowing remaining of the first optical beam to travel in second direction.

27. The optical WDM device of claim 19, wherein the first collimator includes a fiber pigtail and a collimator lens wherein the fiber pigtail and the collimator lens are enclosed by a glass tube configured to transmit optical signals.

28. The optical WDM device of claim 17, wherein the optical relay includes a C-lens based relay lens with a predefined angular gap enclosed in a glass tube and configured to collimate a light beam passing through the optical relay.

29. The optical WDM device of claim 17, wherein the optical relay includes a ball-lens based rely lens with a predefined gap enclosed in a glass tube and configured to collimate a light beam passing through the optical relay.

30. The optical WDM device of claim 17, wherein the optical relay includes a bi-concave-lens based relay lens with a predefined gap enclosed in a glass tube and configured to collimate a light beam passing through the optical relay.

* * * * *